United States Patent [19]

Allard

[11] 4,318,466
[45] Mar. 9, 1982

[54] RAKER APPARATUS

[75] Inventor: Louis R. Allard, Ile Bizard, Canada

[73] Assignee: Beloit Corporation, Beloit, Wis.

[21] Appl. No.: 125,539

[22] Filed: Feb. 28, 1980

[51] Int. Cl.³ ............................................ B65G 65/02
[52] U.S. Cl. ..................................... 198/511; 198/519
[58] Field of Search ............... 198/507, 509, 511, 519; 414/133

[56] References Cited

U.S. PATENT DOCUMENTS

| | | | |
|---|---|---|---|
| 854,626 | 5/1907 | Blaisdell | 198/519 |
| 1,034,366 | 7/1912 | Hutto | 198/511 |
| 3,069,027 | 12/1962 | Dischinger | 198/519 X |
| 3,306,476 | 2/1967 | McMillan | 198/519 |
| 3,915,286 | 10/1975 | Barre | 414/133 X |

Primary Examiner—James L. Rowland
Attorney, Agent, or Firm—Dirk J. Veneman; Gerald A. Mathews; Michael L. Gill

[57] ABSTRACT

A raker boom supports a plurality of independently driven and mounted rotatable raker wheels which are applied to the face of a pile of material to dislodge and move the material downwardly toward a bucket wheel and conveyor for gathering and conveying the material to a remote location for processing. The boom is capable of rotating in a vertical plane so that the raker wheels can contact and remove all of the material through the depth of a pile. By operating the raker wheels individually and mounting them independently, the raker apparatus can travel and apply the individual raker wheels over the surface of a pile of material regardless of its contour. The wheels can break up lumps of material, especially on the surface of the pile, and mix the material with other material within the pile. In one configuration of the preferred embodiment, a pair of opposed raker wheel booms are mounted on a raker carriage which itself is mounted for reciprocal travel on a raker truss. The whole raker truss then travels over the area of the base of the pile of material at right angles to the direction of reciprocating movement of the raker carriage. In another configuration of the preferred embodiment, the raker truss rotates about the center of a pile of material. The truss can be designed to rotate in only one direction, so only one raker wheel boom is needed.

15 Claims, 18 Drawing Figures

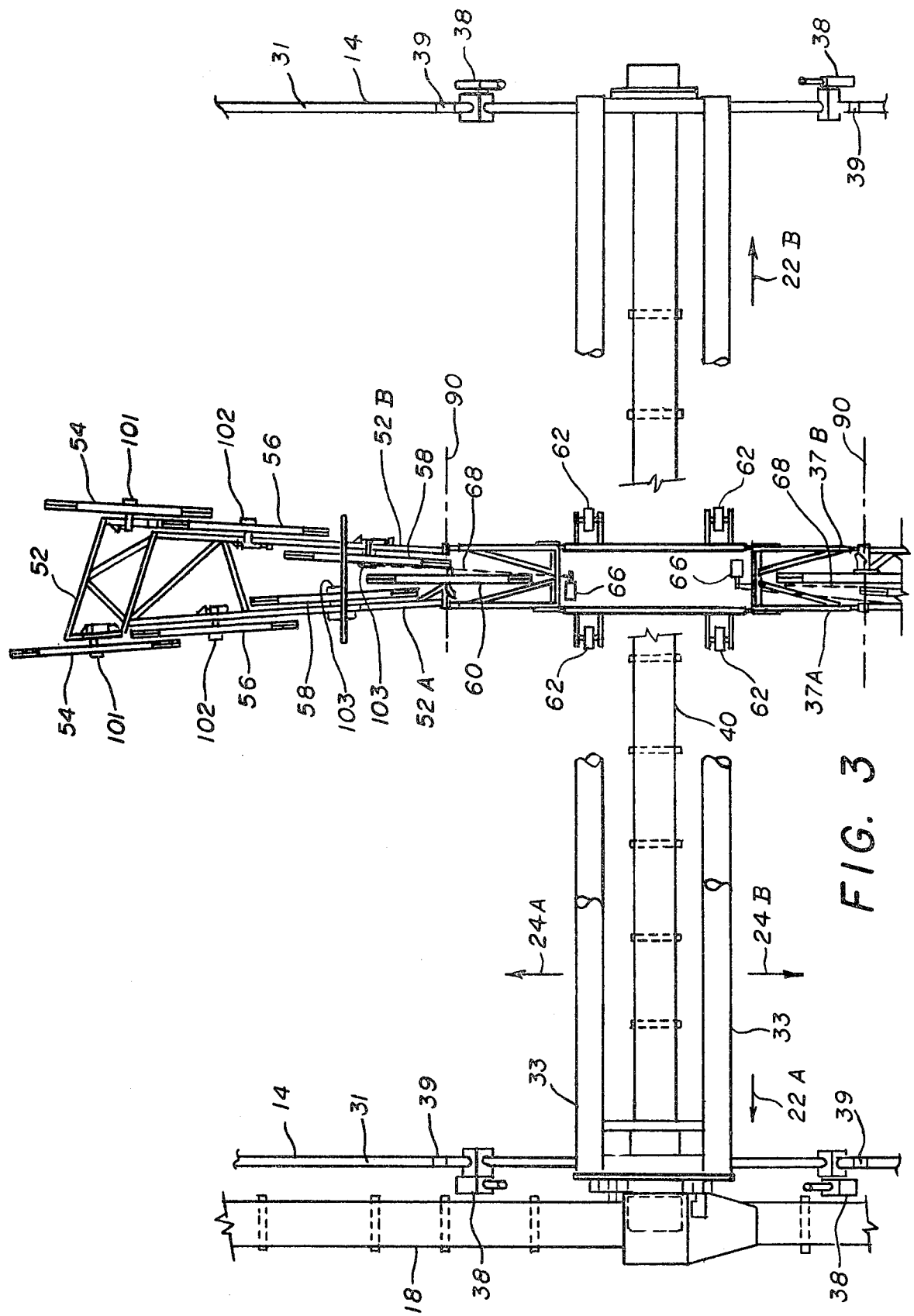

RAKER APPARATUS

BACKGROUND OF THE INVENTION

This invention relates to apparatus for gathering and reclamining particulate material, such as wood chips, bagasse bark, shredded refuse, sawdust and the like, for processing at a remote location. More particularly, this invention relates to a unique boom and raker wheel apparatus for loosening, gathering and blending the material from the surface of a pile and directing it to a means, such as a bucket wheel and a conveyor belt, for removal to a remote point for further processing.

Heretofore, the problems associated with dislodging and gathering material from a pile has effectively prevented uniform reclamation of the material, particularly on any kind of automated basis, for further processing. This is especially true of material which had been stored for relatively long periods of time outside and had compacted or congealed into a solid mass, or when it was desired to reclaim material from outside storage during the winter and some or all of the pile might be frozen. Usually, material was reclaimed by utilizing a bulldozer or power shovel. The bulldozer would dislodge and push the material into a pit from which it was funneled out of the bottom onto a conveyor.

However, use of a bulldozer or power shovel of some kind requires the use of at least one operator and entail numerous other drawbacks in their operation. For example, bulldozers tend to crush some of the material as they operate in and around the pile. Further, both bulldozers and power shovels inherently tend to remove large unit quantities at a time and therefore do not pass the material to downstream processing stations in a relatively uniform, free flowing state, or at a uniform rate. Bulldozers reclaim the material in batches which is not conducive to blending. In addition, bulldozers and other types of crawler type vehicles on which various material gathering shovels might be mounted are primary users of fossil fuels which are becoming increasingly expensive and uncertain in their supply. Finally, there is an element of danger associated with operating a bulldozer in a pile of material that might reach thirty feet in height. If the pile is undercut, the overhanging material might collapse and harm the operator.

SUMMARY OF THE INVENTION

This invention obviates the aforementioned deficiencies in the use of prior apparatus for reclaiming material from large, tall piles.

This raker apparatus is electrically powered and therefore is not directly dependent on the use of fossil fuels. Further, it operates to break up clumps of material during the normal course of its operation and blends material from the top of the pile with material from the interior of the pile so that the material sent to downstream processing stations is uniform in its composition. No part of the machinery is located beneath the pile so it is easy to inspect and have maintenance performed on it. In addition, no operators are required. The apparatus does not work under a head of material such as would be the case if the material were stored in a silo, so there is no grinding or shearing action to cause high wear on the equipment. This is important when reclaiming wood chips and hog fuel because these materials can be highly abrasive and mildly corrosive. They are also compressible and can degrade under severe mechanical action. Further, by reclaiming from the face of a pile at an angle slightly less than the natural angle of repose, material does not free-flow down the face of the pile, but must be moved down by the raking action of the rotating raker wheels so it can be controlled for uniform reclamation and there are no surges in the reclaiming rate. This facilitates operation of the apparatus without requiring an operator, or at least a full time operator.

The apparatus of the invention includes a raker carriage which is mounted on, and reciprocates over, a raker truss. In a preferred embodiment, more than one raker boom is used, and each has one of its ends pivotally mounted on the raker carriage with the other end extending outwardly. A plurality of raker wheels are mounted on each boom independently of one another on pivotable arms so that each wheel can pivot slightly to accommodate variations in the surface contour of the pile on which the raker wheels are operating. Each raker wheel has a plurality of tines extending generally radially outwardly from their mounting position near the periphery of each wheel. Each raker wheel rotates in such a direction as to urge the material downwardly along the slope of the pile to be collected at the bottom by a bucket wheel. The raker wheels nearest the outermost ends of the booms rotate at a slower rate than do the raker wheels nearest the raker carriage in order to accommodate the cumulative volume of material loosened and being raked toward the bottom of the pile.

The raker booms are mounted to a carriage which in turn is set on rails on an elongated, bridge-like raker truss. The raker carriage in a preferred embodiment has two booms mounted on it, one on either side and both being capable of pivoting up and down about a horizontal axis near the bottom of the carriage. The raker carriage reciprocates along the raker truss.

The raker truss is mounted to a frame at either end thereof on which a bucket wheel truss, similar to the raker truss, is also mounted beneath the raker truss and substantially coextensive therewith. The framework on which the raker and bucket wheel trusses are mounted is in turn mounted on rails at either end of these trusses for movement in a direction at right angles to the length of the raker and bucket wheel trusses.

Within the bucket wheel truss is an endless conveyor belt. A rotatable bucket wheel is in turn mounted for rotational movement about the bucket wheel truss so that material directed to the bucket wheel by the rotating raker wheels and movement of the raker carriage is deposited onto the conveyor for movement to a remote location away from the truss apparatus.

The framework on which the raker carriage and bucket wheel and their trusses are mounted move these trusses transversely into the pile of material and the carriage and bucket wheel then reciprocate together along the effective length of their trusses. The raker wheels thus cover the entire area of the pile. The boom on the side of the carriage opposite the pile (i.e. on the trailing side of the truss movement) can be raised to inoperative position. Thus, only the raker wheels on the leading edge of the carriage and raker truss movement contact the material in the pile and rake it downwardly into the path of the co-moving rotating bucket wheel.

Since the bucket wheel is positioned so that its scoops substantially remove the wood chips from ground level, and since the trusses move the raker wheel booms into the pile of chips, the operating angle of the boom against the pile can remain fixed at a few degrees less than the natural angle of repose of the piled material.

The booms need not be lowered except for servicing. Keeping the operating boom at a fixed position also contributes to operating efficiency since raking efficiency decreases at low boom positions.

The wheels on each side of each boom are angled forwardly with respect to the direction of carriage travel to increase their effectiveness.

When the carriage and bucket wheel have traveled to one end of their respective trusses, their directions are reversed. This synchronized, reciprocal movement of the raker carriage and bucket wheel continues until the apparatus has passed through the entire pile of material in the direction of raker and bucket wheel truss movement which has then been carried away on the conveyor belt.

During normal operations, the pile is being replenished on the trailing side of the apparatus so when the raker and bucket wheel trusses reach the end of their intended extent of travel (rectangular pile), their direction is reversed and the raker wheels engage a newly formed pile and the whole procedure is repeated with a new pile being built behind the now reversed raker and bucket wheel trusses.

Accordingly, it is an object of this invention to provide a reclaiming apparatus utilizing at least one rotating raker wheel mounted on a boom which operates in conjunction with a means, such as a bucket wheel, for gathering the material and removing it to a remote location.

Another object of this invention is to provide a reclaiming apparatus utilizing a plurality of individually pivotally mounted and separately driven raker wheels.

Still another object is to provide a reclaiming apparatus wherein a plurality of raker booms, each having a plurality of raker wheels, are mounted to a movable truss which in turn moves in conjunction with a means for gathering material and transporting it away.

Yet another object is to provide a reclaiming apparatus which utilizes at least one boom which is mounted to a carriage which reciprocates on a truss in synchronized movement with a means for gathering material from a plurality of rotating wheels on the boom which selectively engage the piled material.

Another object is to provide an apparatus which achieves any and all of the above objects and which operates substantially automatically.

These and other objects, features and advantages of this invention will become readily apparent to those skilled in the art when the attached drawings are studied in conjunction with the description of the preferred embodiment.

BRIEF DESCRIPTION OF THE DRAWINGS

FIG. 3 is a plan view of the apparatus as shown in FIG. 2, but showing both raker booms extending from the raker carriage.

DESCRIPTION OF THE PREFERRED EMBODIMENT

Figure 1:
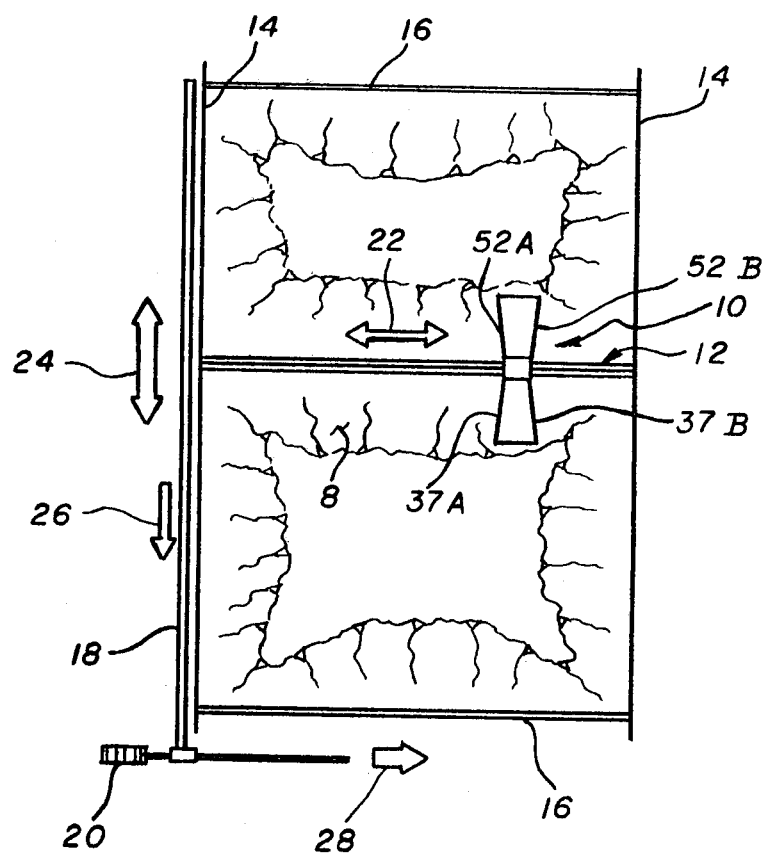
FIG. 1 is a plan view of a rectangular, open top storage bin having rails extending along the tops of two parallel extending sides and showing the two opposed raker booms mounted to the carriage.

FIG. 1 illustrates a configuration of the apparatus utilizing a pair of parallel concrete sidewalls 14 and a pair of parallel end walls 16 which form an open top rectangular enclosure of a pile of material such as wood chips 8. The pile can be built in any of a number of ways, such as by utilizing a movable cyclone distributor supplied by a conveyor. Such pile building methods and apparatus are well known in the industry and will not be discussed further here.

A raker apparatus, generally reference by numeral 10, is mounted for reciprocal motion in the directions indicated by double headed arrow 22 on a raker truss mounted over a bucket wheel truss, both being generally designated by numeral 12. The raker and bucket wheel trusses are in turn supported by an A-frame shaped end truss at the far ends thereof which in turn are supported on wheels which ride on rails 31 on the tops of parallel sidewalls 14. The raker and bucket wheel truss apparatus 12 in turn reciprocates back and forth along the rails on the sidewalls 14 in the directions of double-headed arrow 24 to cover the entire area defined by the side and end walls 14, 16.

Extending the length of one sidewall is a side conveyor 18 which receives the material gathered by the raker apparatus 10 and conveys it in the direction of arrow 26 to one end where it is deposited onto another conveyor 20 for further processing at a remote location in direction 28.

As shown in FIGS. 2 through 6, two raker booms 52, 37 are mounted onto a raker carriage 49 which in turn is mounted to travel horizontally on a raker truss 32.

Figure 2:
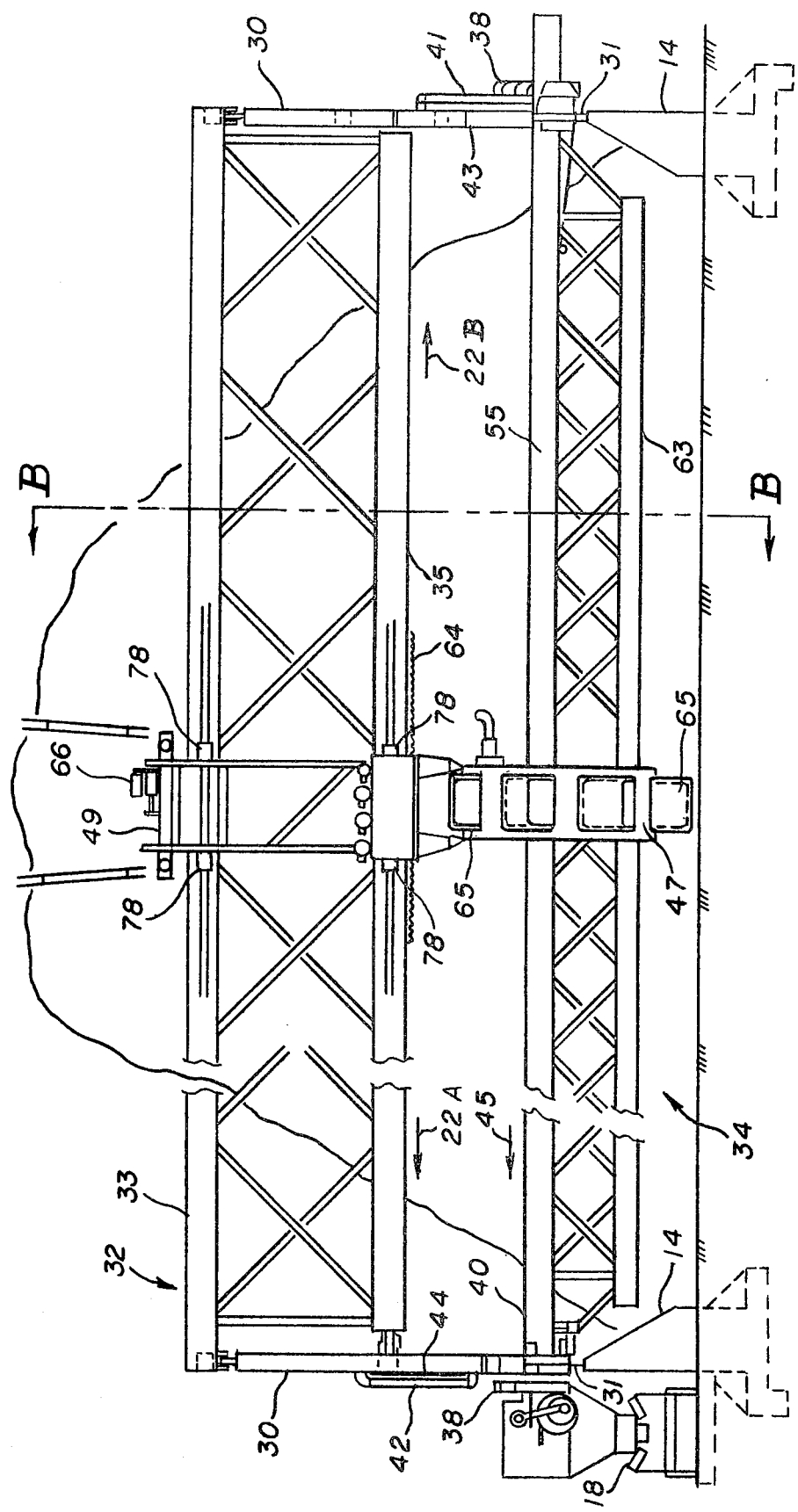
FIG. 2 is a front elevational view of the carriage and bucket wheel trusses with the raker boom in the back shown somewhat schematically and the boom in the foreground not shown for clarity.
Figure 6:
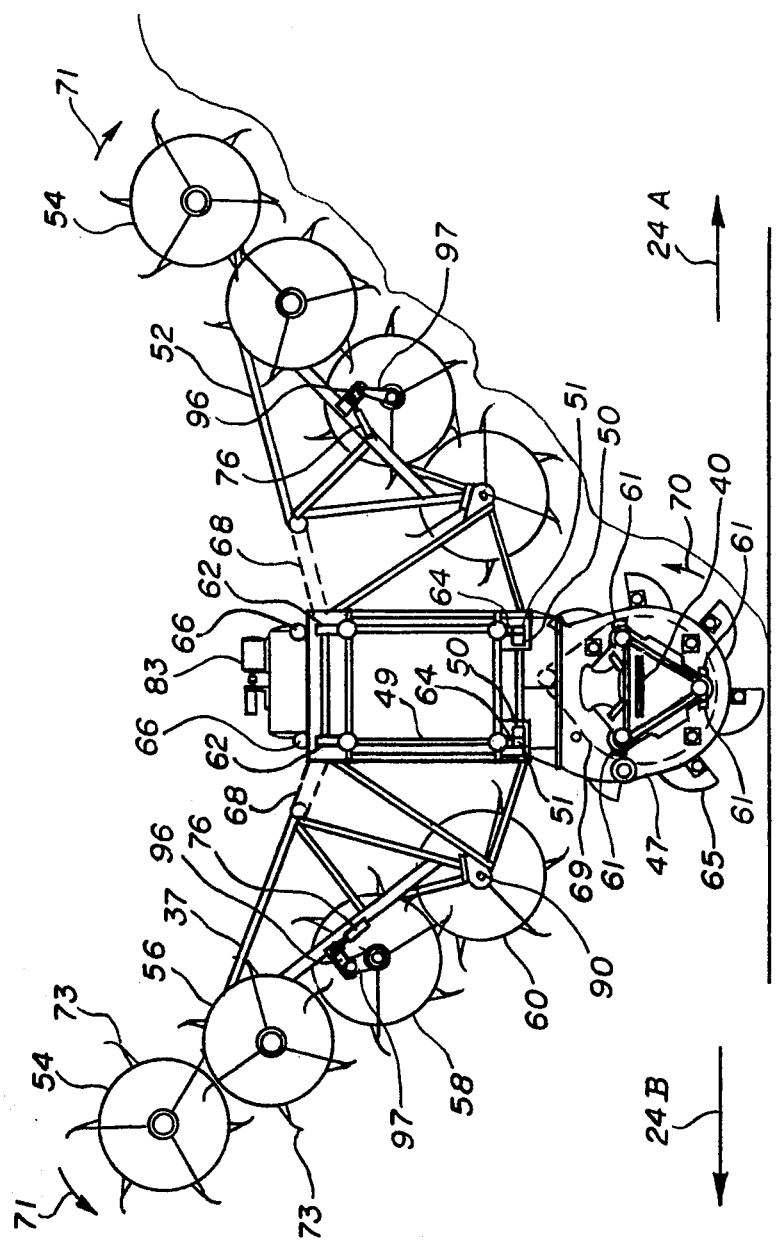
FIG. 6 is an elevational view through section B—B of FIG. 2.

The raker carriage has four guide rollers 62 which support the raker carriage vertically on the top parallel tracks 36 on the upper tubular members 33 of the raker truss 32. In addition, as shown in FIGS. 2 and 6, eight side guide rollers 78 bear against the two upper parallel tubular members 33 and the lower raker truss tubular numbers 35 to guide the raker carriage horizontally along the length of raker truss 32.

Figure 9:
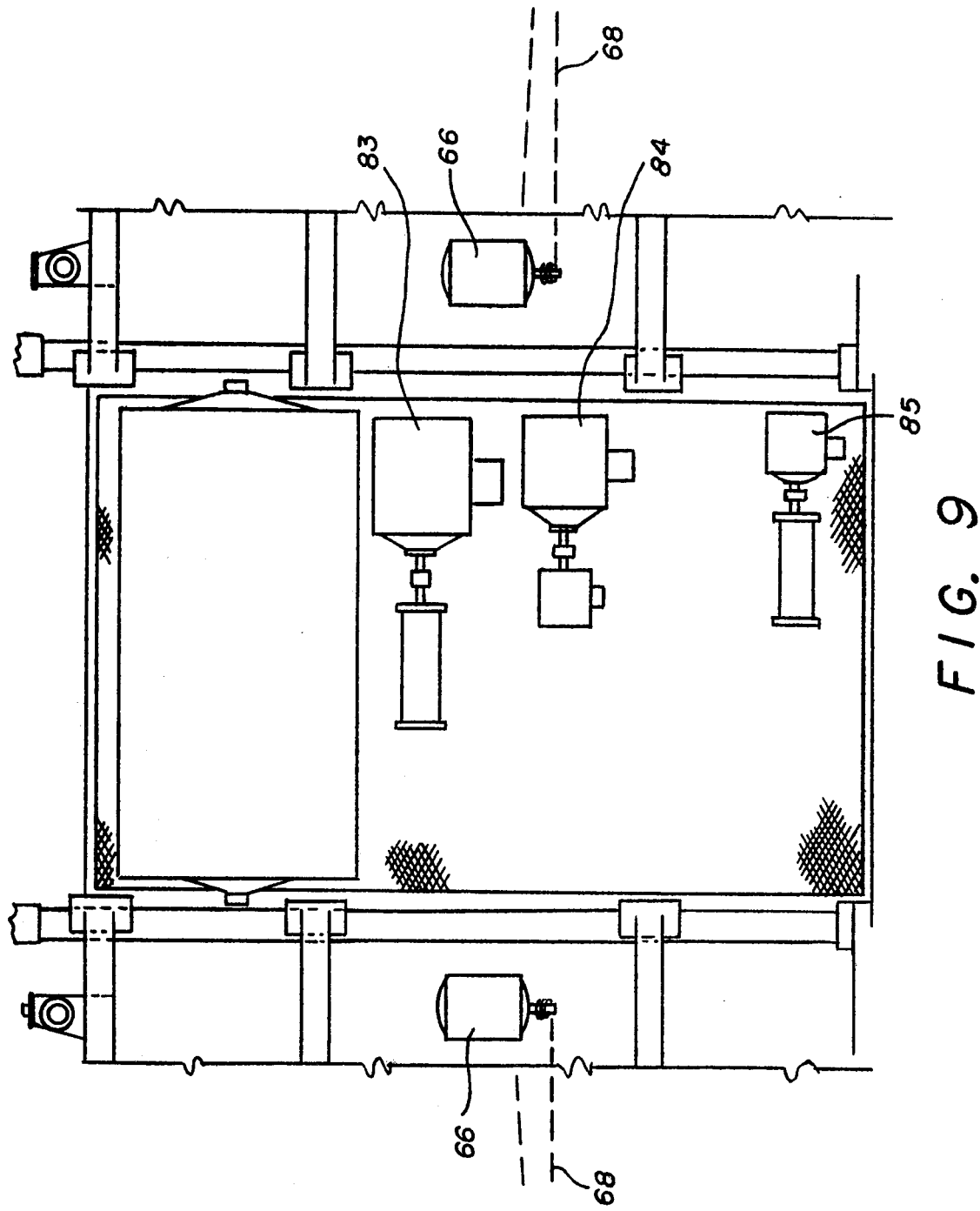
FIG. 9 is a plan view of the raker carriage showing the various motors for supplying power to the apparatus.

On either side of the raker carriage is a hydraulic motor 50 which drives a pinion 51 which engages a rack 64 mounted beneath each of the tubular members 33 of the raker truss 32. These hydraulic motors 50 are in turn powered by an electric motor 84 (FIG. 9) on the top of the raker carriage which powers a hydraulic pump to supply power in a conventional manner.

Figure 5:
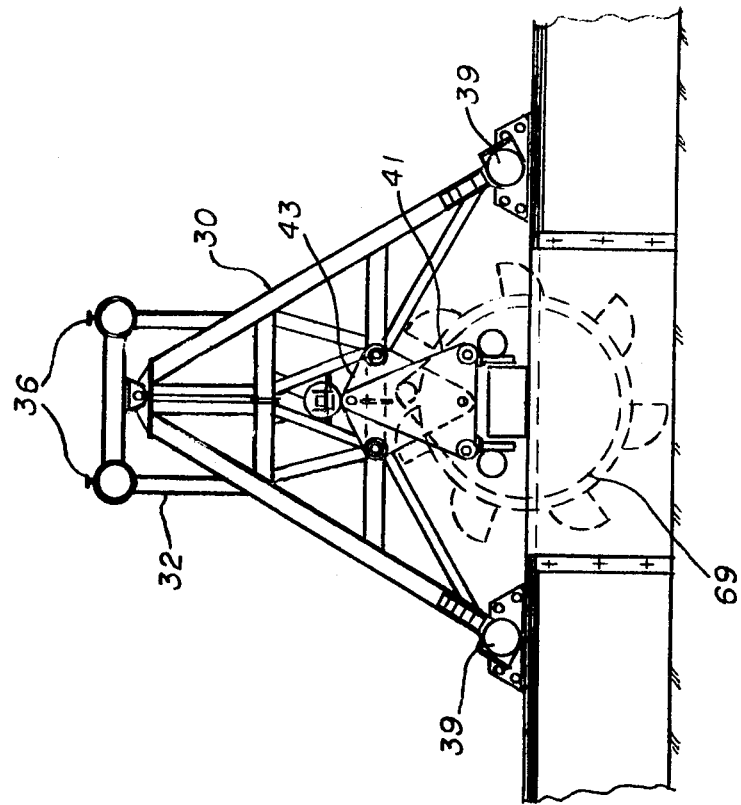
FIG. 5 is an end elevational view of the other end of the apparatus shown in FIG 2.
Figure 4:
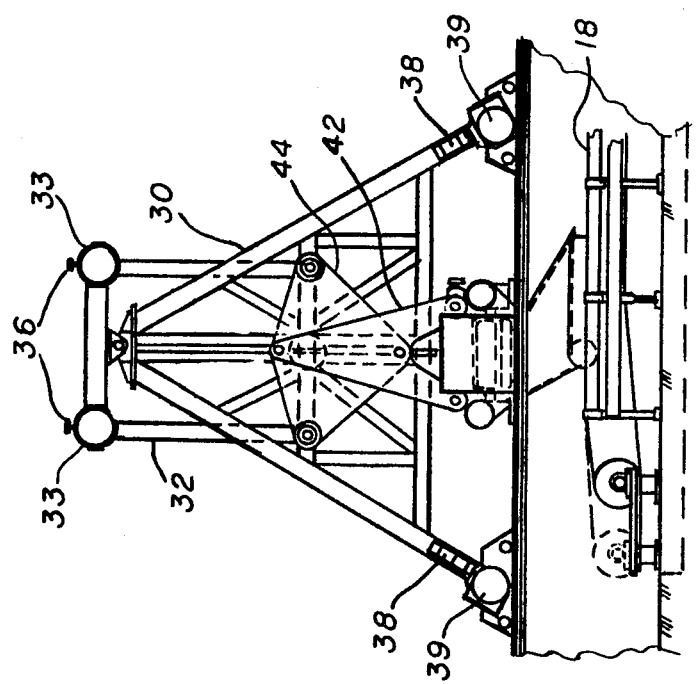
FIG. 4 is an end elevational view of the apparatus shown in FIG. 2 on the bucket wheel conveyor discharge end.

The raker truss 32 is mounted at either end onto an A-frame shaped end truss 30 as seen more clearly in FIGS. 4 and 5. A two speed gear motor 38 is mounted on the bottom portion of each of the two legs of the A-frame on both ends of the raker truss 32. Each of these four gear motors 38 drives a wheel 39 which is mounted on a rail 31 extending along the top of each side wall 14.

Directly below the raker truss 32 is a bucket wheel truss 34 which has a triangular or rectangular cross sectional configuration. This bucket wheel truss 34 is suspended on either end thereof from the A-frame by two plates 42, 44 and 41, 43 at the left and right ends, respectively, as shown in FIG. 2, with three self-aligning bearings in each plate to provide a flexible linkage capable of accommodating skewing of the trusses relative to the A-frame shaped end trusses. Within the bucket wheel truss is a bucket wheel conveyor 40 which is also supported by plates 42, 41 and coextends from one end of the bucket wheel truss to the other and travels in the direction of arrow 45. Material received onto conveyor 40, in a manner to be described later, is carried and deposited onto side conveyor 18 where it is conveyed to a remote location for further processing.

The bucket wheel 47 is suspended from the raker carriage and guided on the raker truss. The bucket wheel is thus powered for lateral movement along its truss by the same hydraulic motors 50 that provide lateral movement of the raker carriage along its truss.

The bucket wheel 47 consists essentially of a plurality of scoops 65 which are mounted on the periphery of a circular frame. Rotary motion is imparted to the bucket wheel by a chain drive 69 which engages the teeth on a sprocket attached to the frame and is powered by a hydraulic motor through a pump driven by motor 84 in a conventional manner. The scoops are pivotally mounted so they can be reversed and operate the same way in both directions when the direction of the bucket wheel is reversed.

Referring to the raker wheel booms which are shown most clearly in FIGS. 6 through 9, both booms 52, 37 are identical, except as hereinafter noted, so only one boom and one pivoted raker wheel will be described in detail with the understanding that the other boom and the manner in which all the pivoted raker wheels, such as raker wheel 58, and direct mounted wheel 60 are mounted thereon and operated will be substantially identical. Therefore, the numerals identifying the various components with respect to one raker wheel boom will be the same when referring to corresponding components on the other raker wheel booms.

The raker wheel booms 52, 37 shown in FIGS. 1, 2, 3, 6, 7 and 8 are pivotally mounted to either side of the raker carriage so as to be able to rotate about an axis 90 where they are attached to the carriage. This axis 90 is parallel to the direction 22 of carriage travel. Each boom has a raker wheel 60 which is rotatably mounted about an axis, such as axis 90, which is also substantially parallel with the direction of carriage travel. In other words, the plane of rotation of raker wheel 60 is perpendicular to the direction of carriage travel.

The other raker wheels 54, 56, 58 are pivotally mounted to boom 52. This is shown most clearly in FIG. 8 where one pivotally mounted raker wheel and its pivoting apparatus are shown in detail together with a non-pivoted wheel 60. A fluid cylinder 76 is mounted to the boom framework with its extendable end linked to a pivot arm 96 which is pivotally mounted in the boom. The pivoted end of pivot arm 96 is secured to a lever arm 97 so that reciprocating movement of the fluid cylinder's rod causes lever arm 97 to pivot about its pivot mounting point 91. The fluid cylinders for supporting and pivoting raker wheels 54, 56 and 58 are powered by a pump driven by a motor 85. Raker wheel 58 is mounted to the non-pivoted end of the lever arm on the hub of a hydraulic motor 103 which is powered by a pump driven by motor 83 (FIG. 9) in a conventional manner. The other pivoted raker wheels 54, 56 and fixedly mounted wheel 60 are similarly driven by hydraulic motors 101, 102, and 104.

Figure 7:
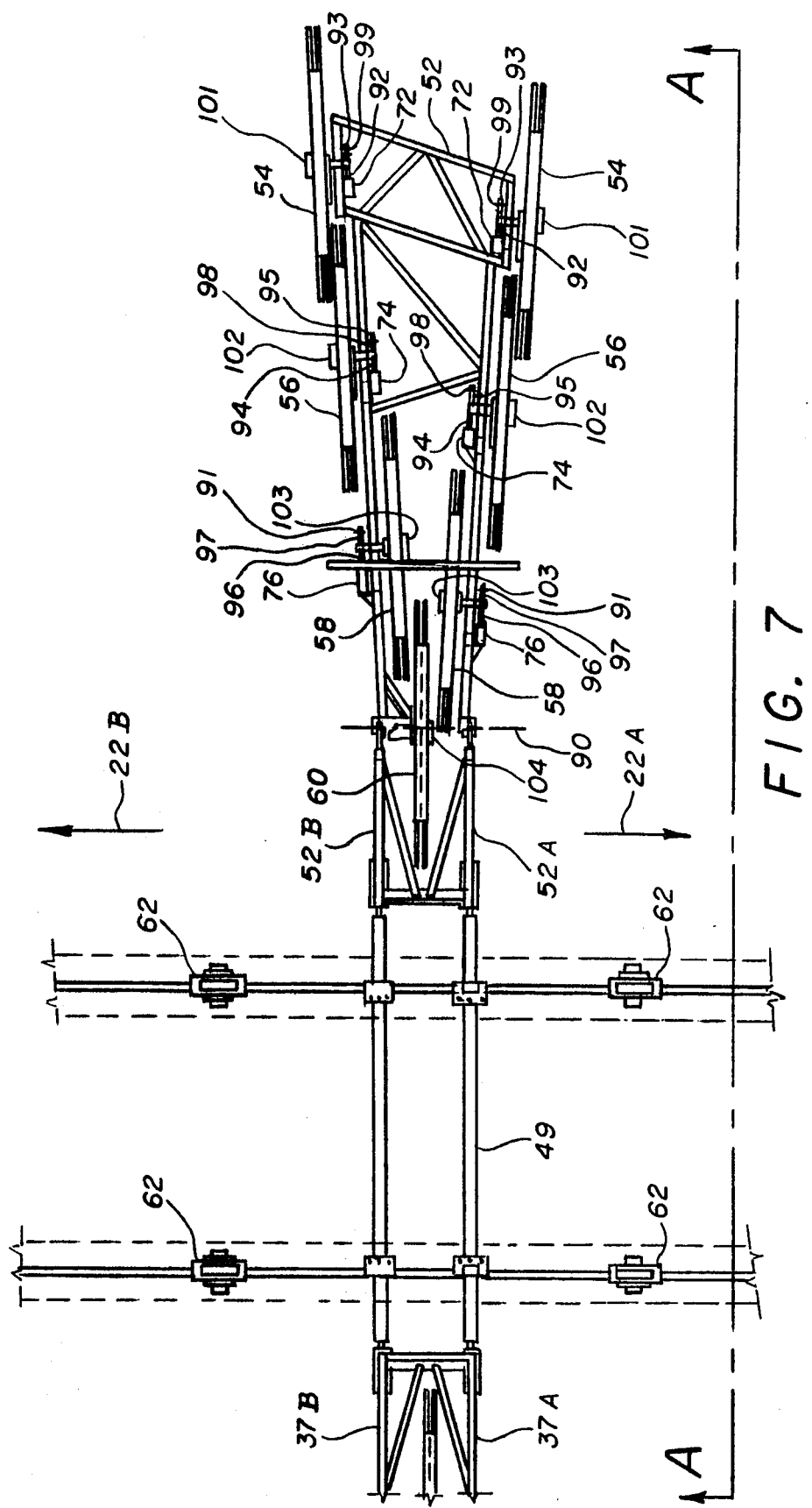
FIG. 7 is a plan view of the raker carriage showing the booms and raker wheels mounted thereon.
Figure 8:
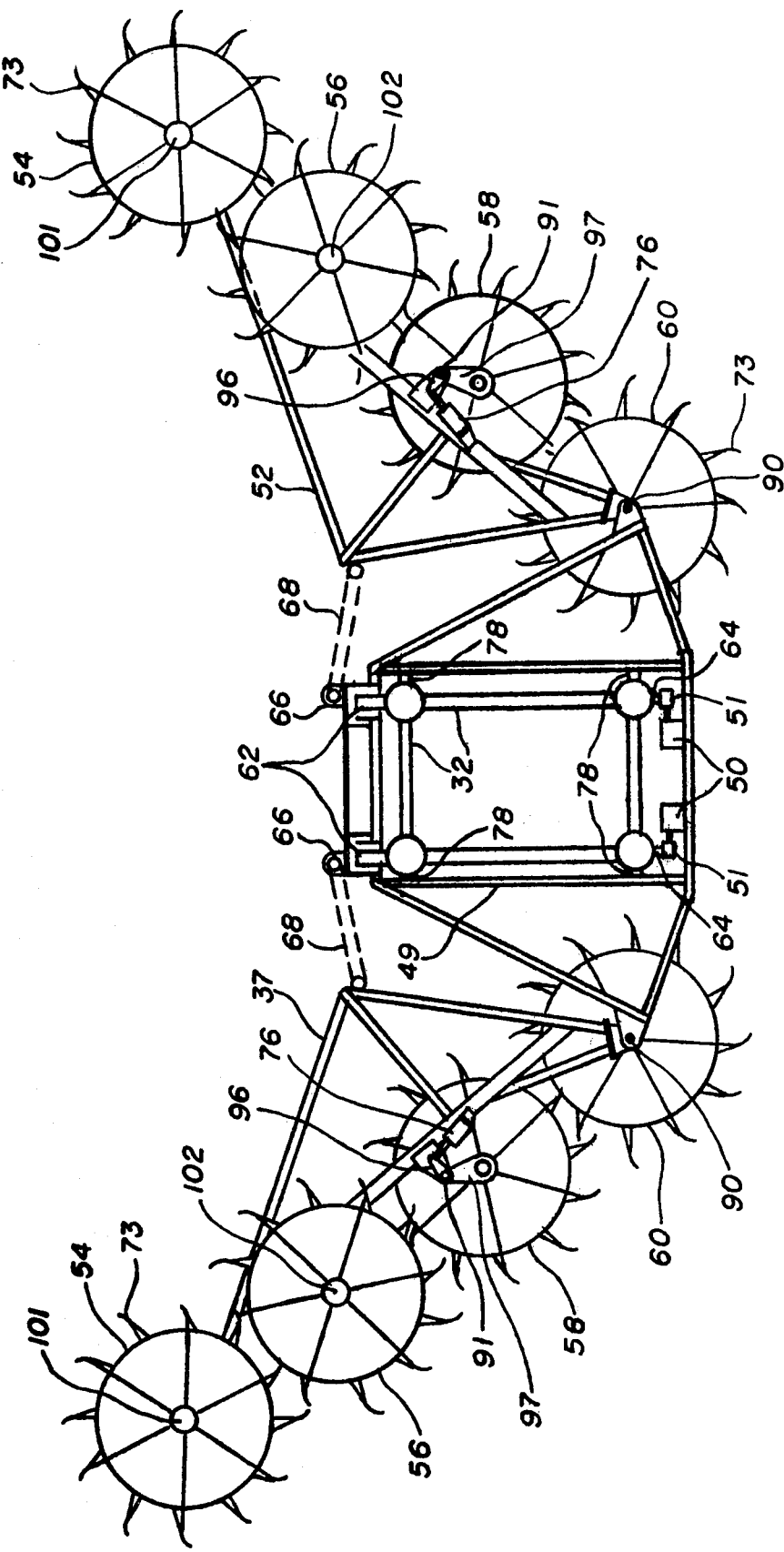
FIG. 8 is an elevational view through section A—A of the raker carriage in FIG. 7 showing the pivoted booms and carriage drive.

As shown most clearly in FIG. 7, the pivoted raker wheels 54, 56 and 58 are mounted to the booms such that they rotate in vertical planes as does fixedly mounted raker wheel 60. However, the pivoted raker wheels on each side of both booms are canted in a forwardly direction with respect to the direction the boom moves when it is in operating position with the raker wheels engaging the piled material. In other words, as shown in FIG. 7, the pivoted raker wheels on the upper side B of boom 52 are canted toward the directional arrow 22B and the pivoted raker wheels on the lower side A of boom 52 are canted toward the directional arrow 22A. In addition, the circular paths of rotation of the raker wheels 54, 56, 58, 60 overlap such that the planes of rotation of raker wheels 54, 56 and 58 are spaced apart and are substantially parallel. Thus, when the raker boom 52 is operatively engaging the piled material and the carriage is moving in direction 22A (FIG. 3), the outermost raker wheel 54 on side A of boom 52 engages material in the pile and under the impetus of its rotation in direction 71 (FIG. 6) the material contacted is urged by its tines 73 downwardly (i.e. inwardly toward the raker carriage 49) toward the adjacent inner raker wheel 56 whose rotating tines are rotating in a plane behind the plane of the adjacent outer raker wheel 54 relative to the direction 22B (FIG. 7) of carriage travel. Thus, as shown in FIG. 6, the raker wheels rotate and contact the material at the outermost extension of their tines and urge it inwardly toward the next relatively inner raker wheel and downwardly toward the bottom of the pile. Each boom is pivotally mounted to the lower portion of the raker carriage 49 about an axis 90 which coextends in the direction 22 of carriage travel. The booms thus rotate in a vertical plane and are lowered for maintenance by motor driven winches 66 which are linked to the ends of the booms with cables 68.

By making both booms wider at their outermost ends than their innermost ends, the pivoted wheels on each side A, B of each boom are easily spaced laterally from one another and naturally canted forwardly with respect to the opposite direction of carriage travel 22A and 22B, respectively as shown in FIG. 7. If the carriage is traveling in direction 22A, the fluid cylinders 72, 74, 76 on the operating boom extending into the piled material on the leading side A are deactivated (i.e. their extendable rod is retracted) to lower the raker wheels into the pile and engage the material under their own weight and rake the material downwardly. The fluid cylinders 72, 74, 76 on the other side B of the same boom are actuated (i.e. their rod is extended) to raise the raker wheels into their inoperative positions above the material. The positions of both the operating and non-operating booms themselves need not, and are not, changed and are maintained at an angle slightly less than the angle of repose of the particular material forming the pile. The boom angle might therefore vary from about 40° to about 60° when the pile composes wood chips or bagasse, respectively.

In operation, with reference to FIGS. 1 and 3, the raker carriage 49 can be considered to be at the far end of raker truss 32 near the right wall. For purposes of discussion, with reference to FIG. 1, we can assume that the raker carriage is also positioned near the lower end wall 16. The raker carriage is then driven by its motors 50 away from the right hand wall. The tines on the rotating raker wheels urge the material in the pile downwardly along the face of the pile from the outermost raker wheel 54 to the innermost raker wheel 60. The raker wheels all rotate in the same direction. As the carriage moves laterally along the raker truss 32, the material in the pile is contacted, broken up, blended with other material and urged downwardly to the bottom of the pile.

When the carriage has reached the left side wall, the fluid cylinders on side A are actuated to raise the raker wheels into inoperative position and the fluid cylinders on side B are deactuated to lower their raker wheels into operating position against the piled material whereupon the carriage direction is reversed. Boom 37 need not necessarily have its fluid cylinders on both sides A, B actuated since there is no pile of material for its raker wheels to engage anyway. Therefore, the wheels on the non-operative boom are preferably in their lowered position. The raker carriage 49 thus reciprocates back and forth with the cylinders 72, 74, 76 on appropriate sides A, B of boom 52 deactivated so that the raker wheels are lowered into operating position to be on the leading side of the carriage in the direction of its movement. With each successive pass, the trusses are advanced a bit more to account for the material removed. This is done by activating the gear motors 38 at their lower extremities to move the A-frame shaped end trusses forwardly on their drive wheels 39. The amount the A-frame trusses are indexed is proportioned to the desired reclamation rate.

As the raker truss 32 moves upwardly, with reference to FIG. 1, to the other end of the enclosure defined by the side and end walls, some means not shown but well known in the industry, such as a cyclone conveyor-stacker, is replenishing the supply of material behind the moving raker truss. When the carriage has reached the far end of the enclosed area and the raker wheels are near the end wall, movement of the raker truss in direction 24A (FIG. 3) through the powered A-frame shaped end trusses traveling on rails 31 is halted and the direction of the raker truss is reversed to go in direction 24B. Also at this time, the fluid cylinders on both sides of boom 52 are deactuated as are the fluid cylinders on the leading side of boom 37 which lowers the raker wheels on boom 37 into operative position to engage the surface of the piled material as the raker carriage is reciprocated laterally along the raker truss 32. The raker carriage then reciprocates back and forth and boom 37 operates in the same manner as the trusses travel in direction 24B as did boom 52 when the trusses were traveling in direction 24A.

As shown in FIG. 2, bucket wheel truss 34 is mounted in the A-frame shaped end truss immediately below the raker truss 32. It is preferred to align the centerline of the bucket wheel with the center plane of rotation of raker wheel 60. This is why the bucket wheel is fixedly suspended beneath the raker carriage.

In order to efficiently gather the material into the bucket wheel regardless of whether the boom is traveling in direction 22A or 22B, raker wheel 60 on both booms is rotatably mounted about an axis which is substantially parallel with the direction of travel 22. The circular path of travel of the tines of wheel 60 comes close to the floor in order to urge the material into the scoops of the bucket wheel. In this way, only one raker wheel 60 is required on each boom.

Since the bucket wheel truss is also mounted in the A-frame shaped end trusses, it moves laterally with the raker truss in directions 24A, B. Referring to FIGS. 2 and 6, the bucket wheel always moves in synchronized coordination with the raker carriage in their reciprocating travel along their trusses.

The rotating bucket wheel scoops thus are supplied with material by one set of rotating raker wheels on one of the raker booms depending on the direction of lateral translation 24A, 24B of the raker and bucket wheel trusses and the direction of movement of the raker carriage and bucket wheel 22A, 22B on their trusses. The scoops 65 on the rotating bucket wheel thus gather the material at the low point of their travel and carry it upwardly. Near the top of their circular path of travel in direction 70, the material falls out of the scoops and onto the conveyor 40 which travels through the center of the bucket wheel. The scoops 65 are pivotally mounted on the bucket wheel as they function in the same manner when the direction of the bucket wheel is reversed when the direction of lateral translation is reversed from 24A to 24B.

Coordination of the movement of the raker booms 52, 37, the raker carriage 49, the bucket wheel 47, as well as the reciprocal movement of the A-frame shaped end trusses 30 along the rails on top of the side walls 14 is automatically accomplished by the use of switches which are actuated by the positions of these components relative to their intended limits of travel. These types of switches, such as limit switches, and the manner in which they are connected to control the operation of motors is well known by those skilled in the art and, accordingly, will not be discussed here further.

Thus, when the A-frame shaped end trusses reach the end of their travel near the end walls, they contact a switch which reverses their drive motors 38 when the boom that is then currently in operating position reaches the side wall it is moving toward. These conditions then actuate the fluid cylinders and drive motors on the pivotally mounted raker wheels on the appropriate side of the boom on the opposite side of the raker carriage to place them into operating position, and to deactuate the fluid cylinders and drive motors on the boom just finishing its operation whereupon the direction of the raker and bucket wheel trusses is reversed as the gear motor drives 38 on the A-frame shaped end trusses move them toward the opposite end wall. This cycle repeats as the trusses reciprocate back and forth.

When the raker and bucket wheel trusses are intermediate their furthest positions between the end walls, the reciprocal movement of the raker carriage and bucket wheel on their respective trusses is controlled by switches near either end of their trusses which reverse their directions as well as raising and lowering the appropriate booms so that the boom in the leading direction, considering the direction of travel of both the raker and bucket wheel trusses and the direction of the raker carriage, is in operating position. When a boom is in its operating position, the individual raker wheel drive motors 101, 102, 103 and 104 on that boom are activated to begin rotating the raker wheels. The speed of each motor is independently controlled so that the speeds of the raker wheels on each boom can be varied to accommodate the movement of any increasing volume of material as the material is urged from the top of the stack to the lower level. Typically, the speed of the outermost raker wheel 54 having a 7.5 foot diameter might be about 16 rpm whereas the speed of the innermost raker wheel 60 might be about 30 rpm. For a bucket wheel having a 12 foot diameter, the rotational speed might be typically about 5-6 rpm.

When the booms are lowered into position and the raker wheels are contacting the piled material, the pivoted raker wheels 54, 56 and 58 are biased against the material by the force provided by fluid cylinders 72, 74, 76 which rotate their respective pivot arms 92, 94, 96 to turn their respective lever arms 93, 95, 97 so that the raker wheels are resiliently engaging the piled material regardless of localized variations in the surface contour beneath the individual raker wheels. In normal operation, the fluid cylinders are actuated by motor 85 which powers a pump in a conventional manner and the raker wheels are pivoted about pivot points 98, 99 and 91 to extend about halfway between their fully raised and fully extended positions. They can thus more readily move either upwardly or downwardly to follow the contour of the piled material.

Finally, with respect to the reciprocating movement of the carriage along its truss, the speed of carriage travel is varied along its path of travel as a function of its location from the ends of the truss. This is to account for the change in the elevation of the pile, due to the angle of repose of the material, as well as the variation in the cutting depth that the raker wheels must pass through as they pass through the triangular shaped cross sectional face of the piled material.

Such variation in the carriage traversing motors' speed can be programmed and controlled either electronically, such as by a timer or counter arrangement, or mechanically, such as by a cam actuated switch. Either way, the motors' speed is varied by varying the hydraulic fluid flowing to the traversing motors. The preferred embodiment of these controls will be discussed in more detail later.

Figure 10:
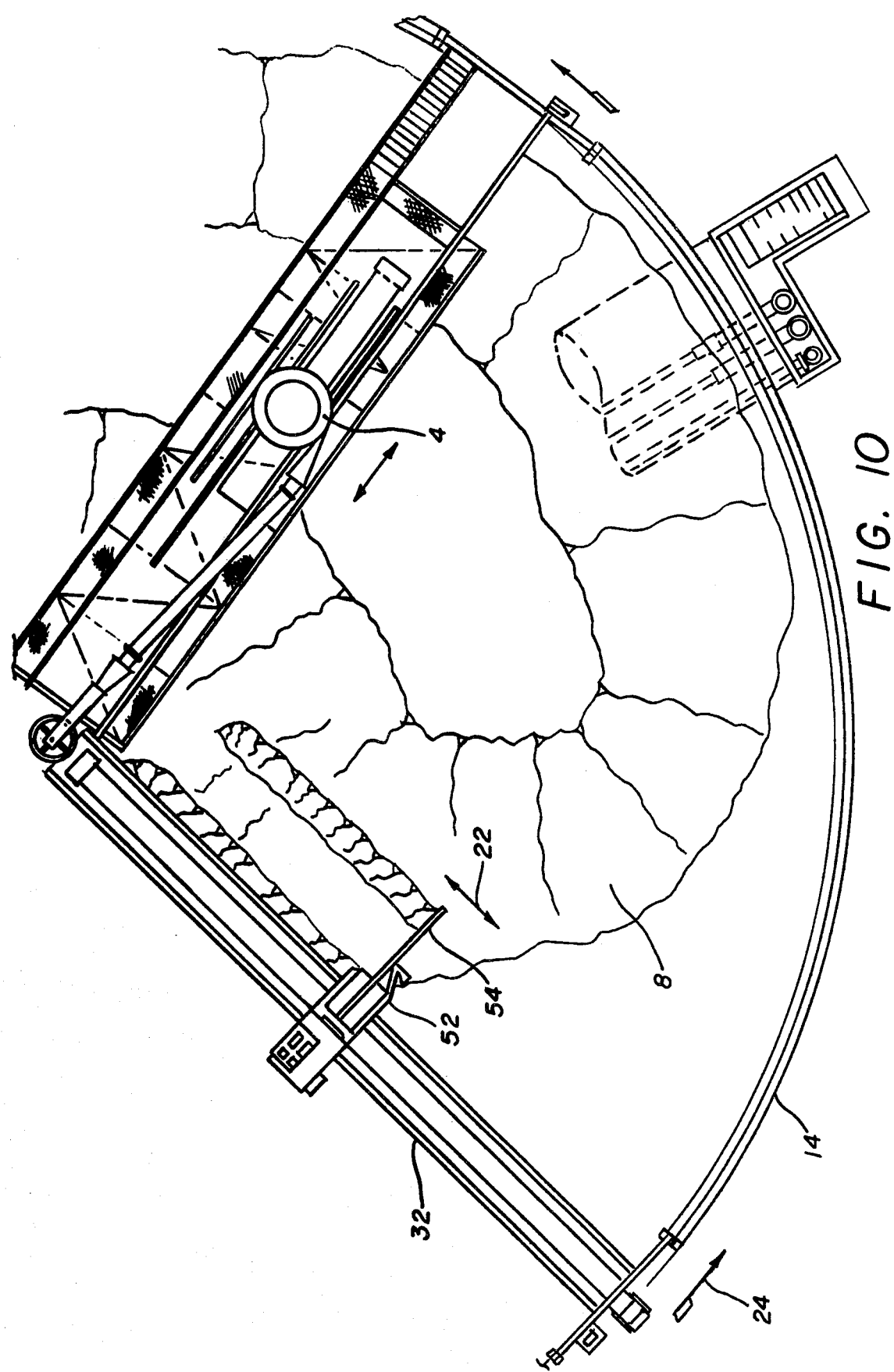
FIG. 10 is a plan view of a circular storage bin having a rotating truss apparatus.

Other configurations of the preferred embodiment of the raker apparatus are contemplated. For example, a circular storage area shown in FIGS. 10 and 11 could be used instead of a rectangular storage area. In the case of a circular storage area, there would only be one peripheral wall and the raker and bridge trusses would have one end truss pivotally mounted to move about a center pivot with their other end mounted in an end truss which travels on a rail on top of the circular outer wall in the same manner in which the A-frame end trusses previously described move along the side walls 14 of the rectangular storage area. Movement of the raker and bucket wheel trusses in the circular configuration could be in one direction continuously since there is no need to provide for any change of direction. This would eliminate the need for any booms on the trailing side of the raker carriage. Thus, some known means for replenishing the pile, such as the cyclone/belt conveyor-stacker 4 shown in FIGS. 10 and 11, could operate behind the apparatus to provide for continuous rebuilding of the contents of the pile simultaneously with the reclaiming operation of the raker and bracket wheel apparatus. The reciprocating movement of the raker carriage and bucket wheel is the same as with the trusses mounted over the rectangular storage area. The angular sweep of the trusses through 360° effectively provides the same sort of angled engagement of the rotating raker wheels with the piled material so that the raker wheels need not be canted with respect to the boom itself. Thus, the pivoted raker wheels rotate in the same plane or parallel planes with the non-pivoted raker wheel 60. Also, the transverse movement of the raker and bucket wheel trusses over the area covered by the pile is the same except for the fact that one of their ends is pivotally mounted in its end truss while the other end has its end truss guided over the outer periphery of the stack defined by the wall. This means that each indexing movement of the outer end truss supported on the circular wall causes the bucket wheel truss to traverse a pie-shaped slice of the pile. The use of switches to control the reciprocating movement of the booms, raker carriage and bucket wheel would also be similar to that described in conjunction with the rectangular configuration. Corresponding numerals denote corresponding elements.

While the circular configuration is expected to have greater commercial application, the rectangular configuration of the preferred embodiment has been described in more detail since it is the more complex configuration and its structure and operation are generic to both the circular and rectangular material storage configurations.

Figure 11A:
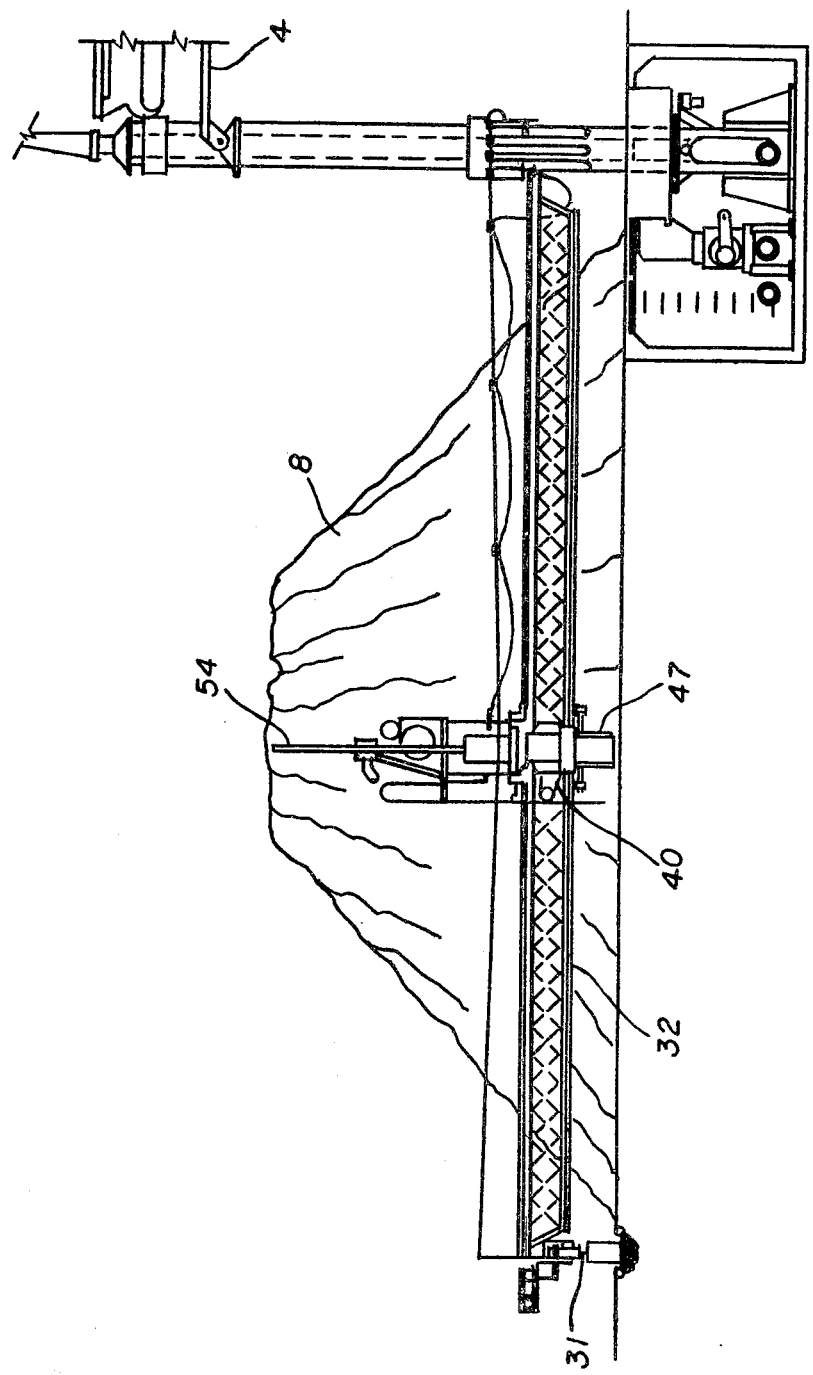
FIGS. 11A and 11B are elevational views of the circular storage bin shown in FIG. 10.
Figure 11B:
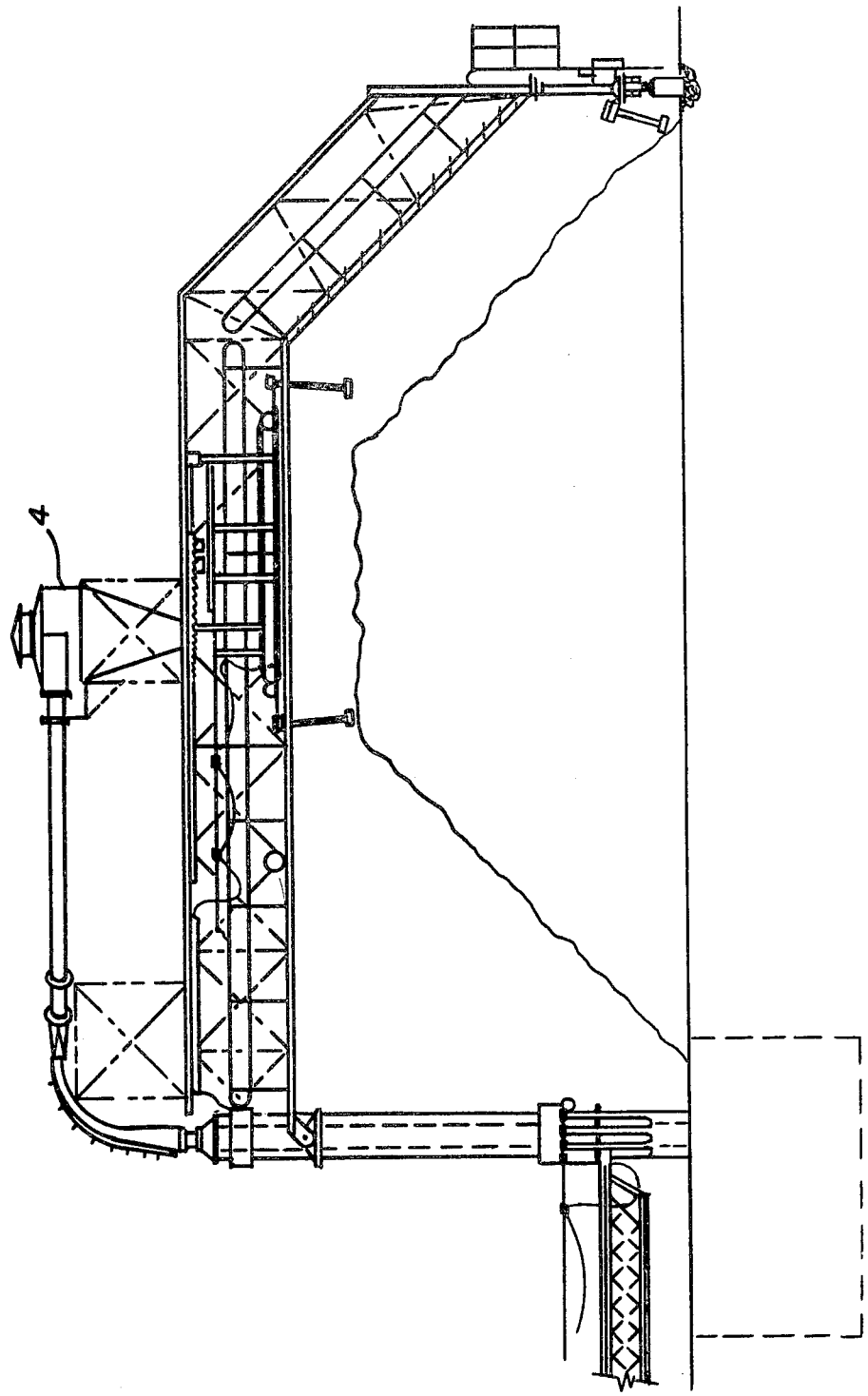

It is very desirable to reclaim the material from the pile as uniformly as possible. To do this, the speed of the raker carriage and bucket wheel must increase as they approach the edges of the pile regardless of whether the pile is in a circular or rectangular configuration. This is to account for the diminishing height of the vertical cross section of the pile as the edges of the pile slope to the ground. Where the height of the pile is substantially level, the lateral traversing speed of the bucket wheel is substantially constant. A cross sectional silhouette of this pile shape as shown in FIG. 11A.

As the pile slopes to the ground, it takes less time for the raker wheels to travel from the top of the pile to the bottom. There is less material to reclaim in each such vertical cut through the pile, so the raker wheels and bucket wheel must be moved laterally along their support truss faster in order to maintain a substantially uniform volume of material scooped up by the bucket wheel and sent to the conveyor.

Figure 12:
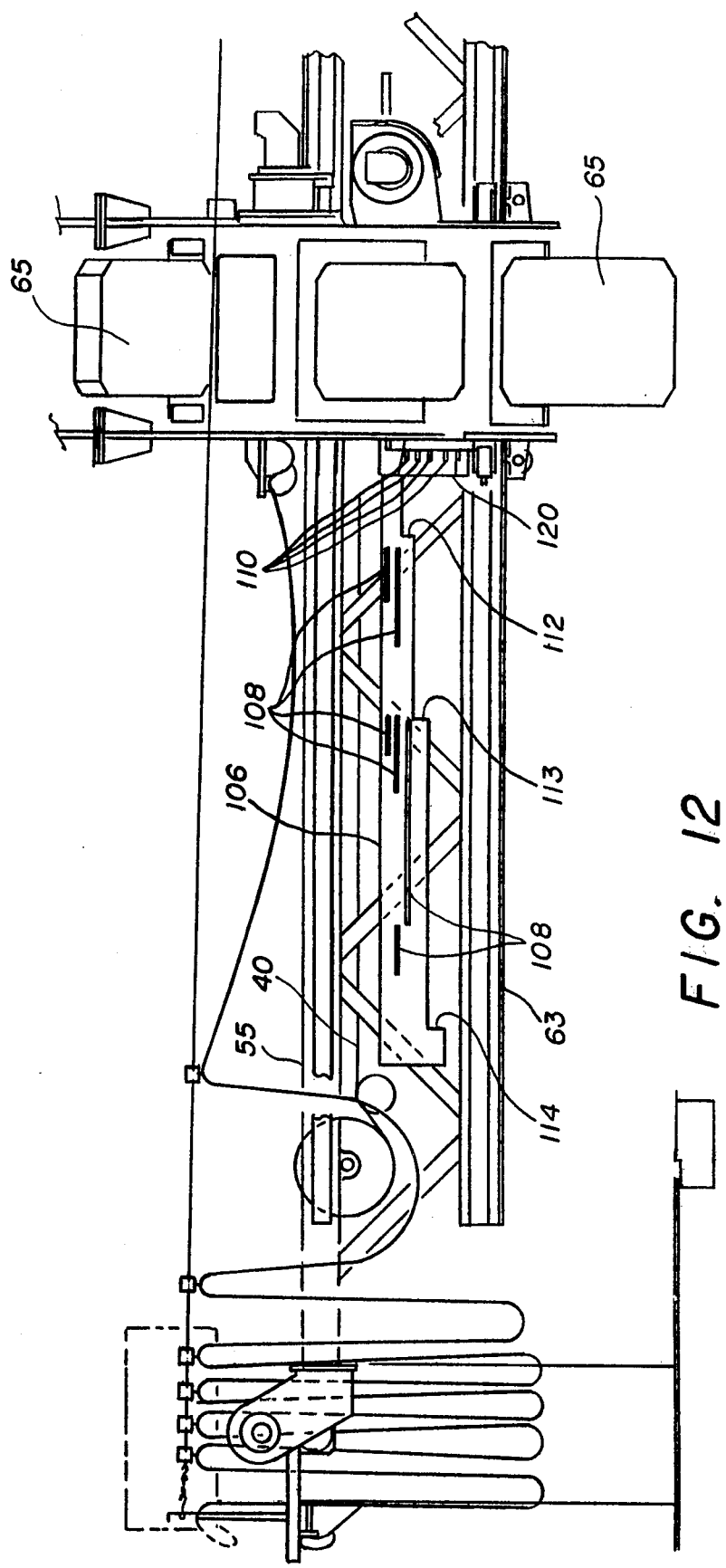
FIG. 12 is a more detailed elevational view of the rotating bucket wheel truss shown in FIGS. 11A and 11B and illustrates the control plate and bracket mounting the proximity switches.
Figure 13:
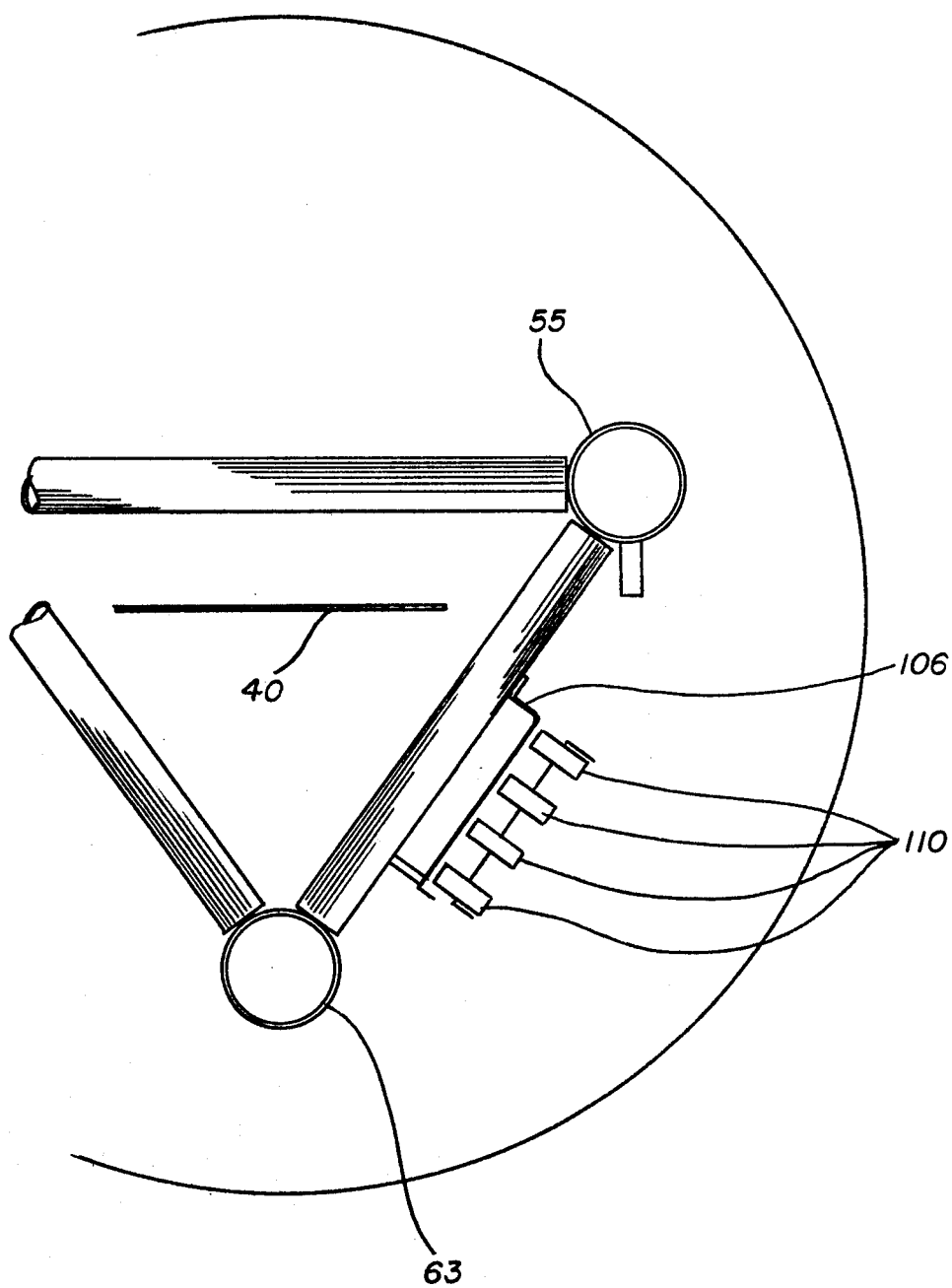
FIG. 13 is a view from the pivoted end of the bucket wheel truss shown in FIG. 12.

To accomplish this change in traversing speed automatically without the aid of an operator, the speed of the traversing motors is controlled by a series of electromagnetic proximity switches which operate in conjunction with special control plates attached to the raker/bucket wheel truss to activate a corresponding series of check valves which open and close orifices in the hydraulic line connecting the pump 81 supplying fluid to power the hydraulic drive motors 50. Referring to FIGS. 12 and 13, a control plate 106 is mounted to the bucket wheel truss 34 near either end thereof and extends longitudinally therealong. For simplicity, only one end of the raker/bucket wheel truss has been shown in FIG. 12. Each control plate 106 contains a plurality of slots 108 which are arranged in four, vertically arrayed, horizontally extending rows. The slots are of different lengths and begin at different positions along the control plate. Four corresponding electromagnetic proximity switches 110A, B, C and D are mounted on a bracket 120 to the raker carriage 49 and therefore traverse the bucket wheel truss with the bucket wheel. Each switch is positioned to traverse over a separate slot in the control plate. The proximity switches 110 are activated when in proximity to the metal of the control plate and are deactivated when either not over the control plate or when over a slot in the control plate. For convenience, the bottom of the control plate has been notched 112, 113, 114 to effectively form slots therein. The slots and notches effectively form perforations in the plates and the plates themselves function to locate where the proximity switches will operate along the length of the bucket wheel truss. The notch 112 at the innermost end of the control plate thus takes the place of two slots. The length of the slots or notches thus controls the length of time the desired switches are activated.

Each proximity switch 110 A, B, C and D is linked electrically with a corresponding check valve 118A, B, C and D in a bank 116 of control orifices in the hydraulic line between the pump 81 and the carriage traversing motors 50 it powers. When a proximity switch is activated, it signals its corresponding check valve to open and pass hydraulic fluid through the orifice it controls to thereby increase the speed of the traversing motors 50 by an amount corresponding to the size of the particular orifice and the amount of hydraulic fluid it passes. One orifice has no check valve and is of a selected size to pass the desired minimum rate of hydraulic fluid to power the motors to move the bucket wheel traversely along its truss at a predetermined low speed. This is the slowest desired traversing speed. Each of the four other orifices is controlled by a check valve. One of these check valve controlled orifices is also of a small size to pass a low rate of fluid to the traversing motors 50. Each of the other check valve controlled orifices is sized to pass double the flow rate of another of the check valve controlled orifices, so that by opening and closing various combinations of check valves, the flow of hydraulic fluid from the pump to the carriage drive motors can be varied and closely controlled. The smallest orifice, for example, can be selected to pass 0.4 gal/min. of hydraulic fluid. The smallest check valve controlled orifice can be the same size as the non-check valve controlled orifice, but they don't have to be the same size. Therefore, when the pump is powering the hydraulic motors driving the raker carriage, and all the check valves are closed (i.e. when the proximity switches are deactivated), the bucket wheel will still be traversing the pile at the slowest desired speed which corresponds to the flow rate (0.4 gal/min. for example) through the fifth, non-check valve controlled orifice. Thus, for example, if the rate of flow were 0.4 gal/min. through the first orifice, 0.8 gal/min. through the second orifice, 1.6 gal/min. through the third orifice, and 3.2 gal/min. through the fourth orifice, the speed of the carriage/bucket wheel drive motors 50 could be varied by a ratio of 16:1 (6.4/0.4) in small increments.

Figure 14:
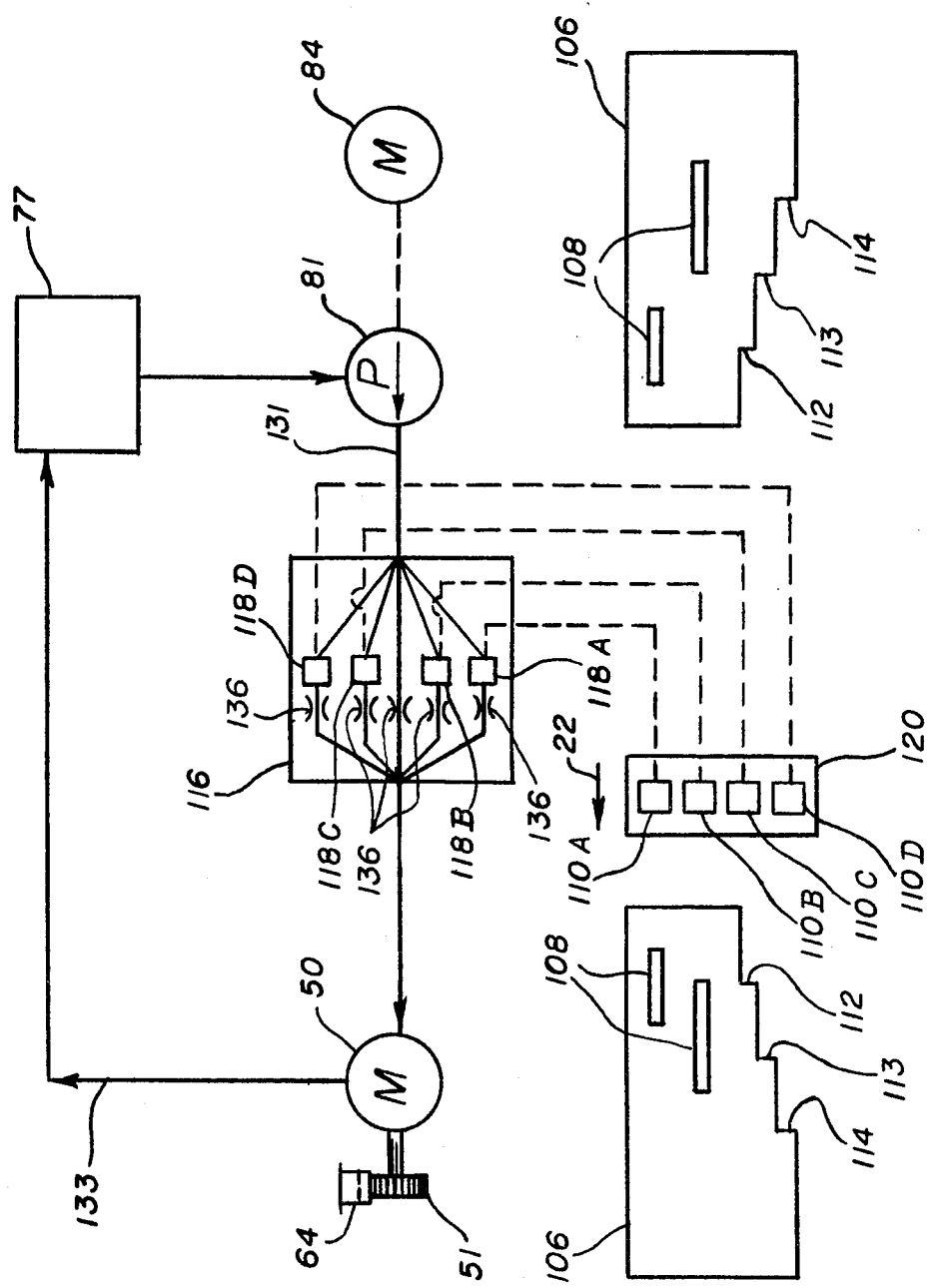
FIG. 14 is a schematic drawing of the system controlling the traversing speed of the bucket wheel.

The schematic drawing of this speed control is shown in FIG. 14. Electric motor 84 powers a pump 81 which supplies hydraulic fluid from a reservoir 77 to a bank 116 of control orifices 136 controlled by check valves 118A, B, C, and D through a hydraulic line 131. When all of the orifices are open, fluid flows unimpeded at 6.4 gal/min. (using the flow rates given above) to each hydraulic motor 50 powering the raker carriage. The hydraulic fluid returns to the reservoir through line 133. The raker carriage then will move at its top speed.

When the proximity switches 110A, B, C, D are not in proximity to metal, as when the raker carriage and bucket wheel are in the middle of their truss where there is no control plate 106 or when the proximity switches are over the slots 108 or notches 114 in the control plate, they are not producing a signal so their corresponding check valves 118A, B, C, D are closed and the raker carriage and bucket wheel are traversing their support truss at the slowest speed corresponding to the size of the orifice which is always open and not controlled by a check valve between the pump and carriage drive motors.

The carriage speed is thus constant over the middle of the pile where the top is relatively level. Near the edges of the pile where it begins sloping to the ground, the proximity switches pass over the control plate 106. The notches 112, 113 and 114 and slots 108 are positioned in the control plate in such a location and for such a length that they activate those specific proximity switches which will open the corresponding check valves in the bank of control orifices such that the flow of hydraulic fluid to the drive motors 50 will be varied so that the traversing speed of the bucket wheel will increase as a function of the slope of the pile of material in order to maintain the volume of material received by the bucket wheel and deposited onto the bucket wheel conveyor 40 at a substantially constant rate.

Figure 15:
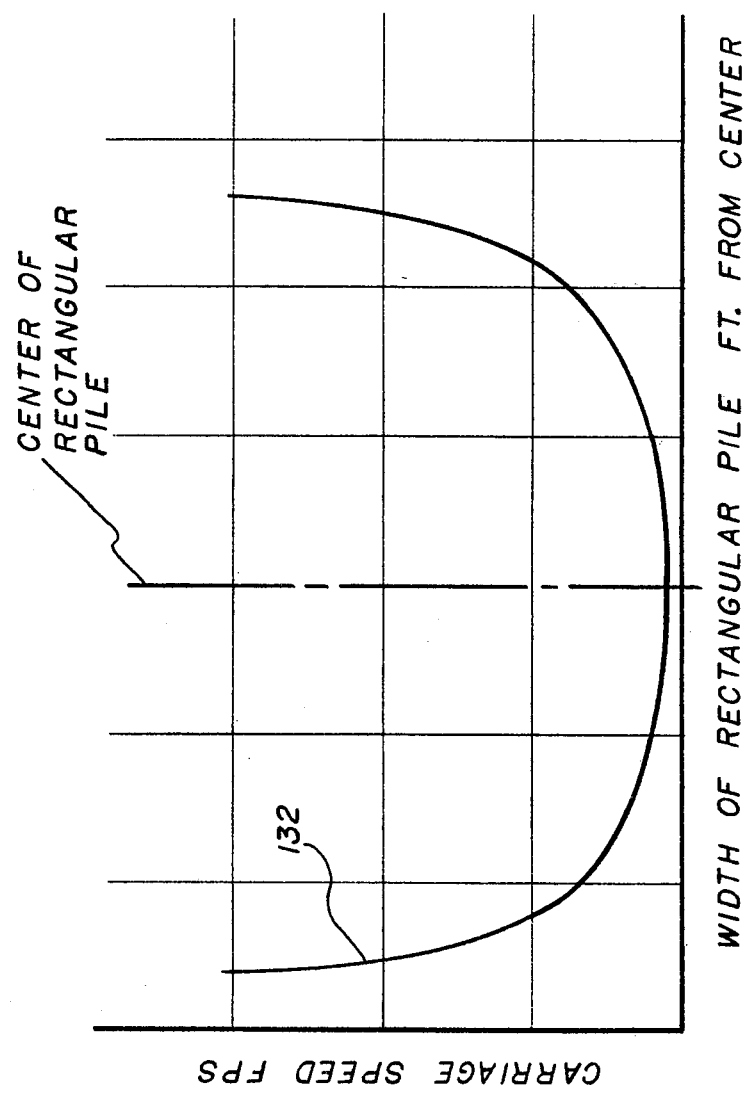
FIG. 15 is a curve relating the traversing speed of the carriage supporting the bucket wheel with the width of a rectangular pile of material.

FIG. 15 shows an idealized curve 132 of the flow rate through the control orifices (corresponding to the traversing speed of the bucket wheel along its truss) with regard to the width of a rectangular pile of material (FIG. 1) taken along a cross sectional plane.

Figure 16:
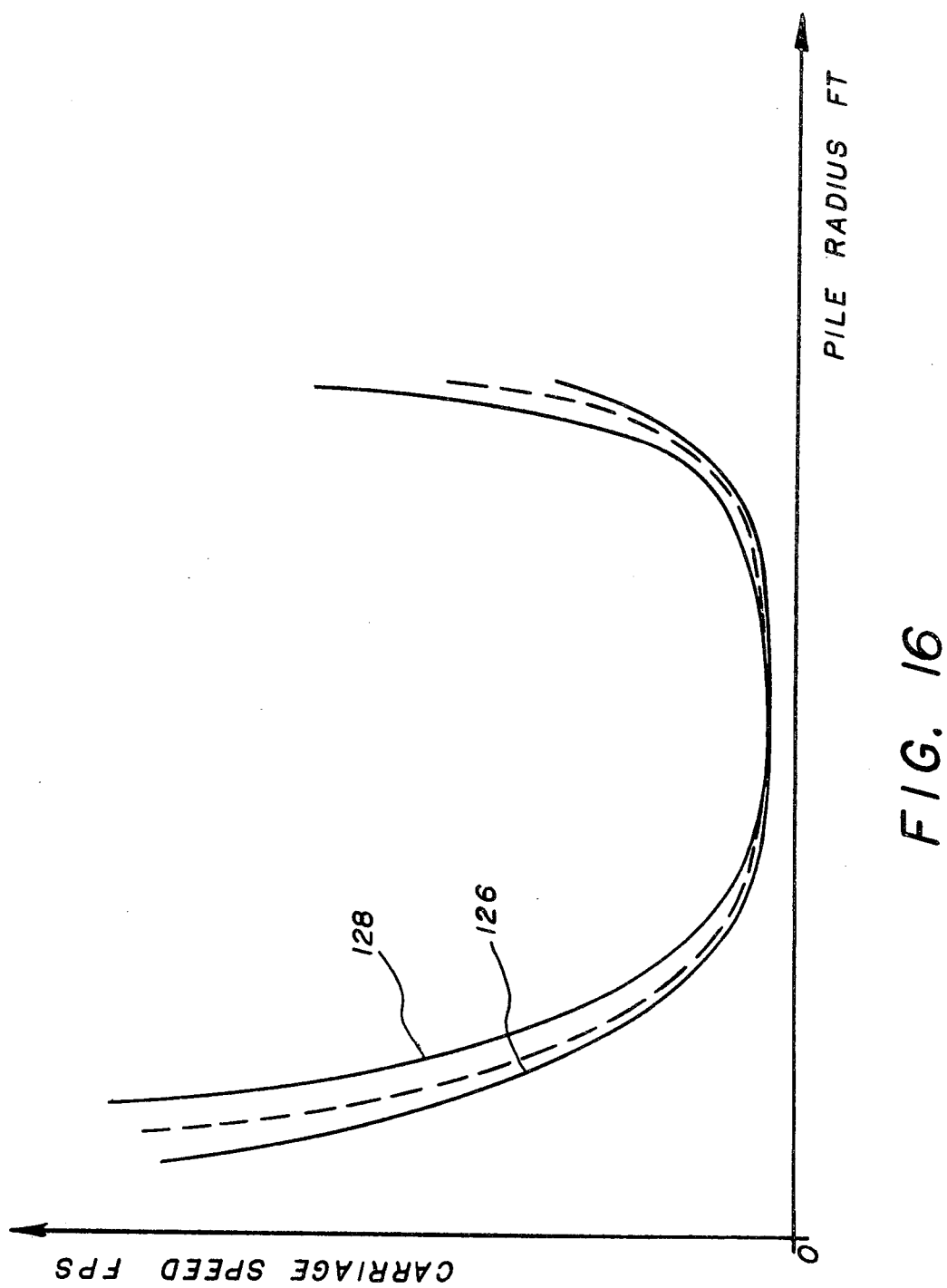
FIG. 16 is a curve relating the traversing speed of the carriage supporting the bucket wheel with the radius of a circular pile of material.

FIG. 16 is a similar curve where the carriage speed is plotted against the distance from the center of bucket wheel truss rotation with respect to a circular pile of material. There are two curves to reflect the slight differences in carriage speed according to whether the carriage is traveling in the same direction as the discharge conveyor 40 or in the opposite direction to the conveyor travel. Thus, if the bucket wheel is traveling toward the center of rotation in the same direction as the discharge conveyor (curve 126), it will not have to travel as fast in order to maintain the volume of reclaimed material at the same rate as when the carriage is traveling away from the center of bucket wheel truss rotation (curve 128). The curve 130, shown in dashed line, represents a single, composite curve combining curves 126 and 128.

Figure 17:
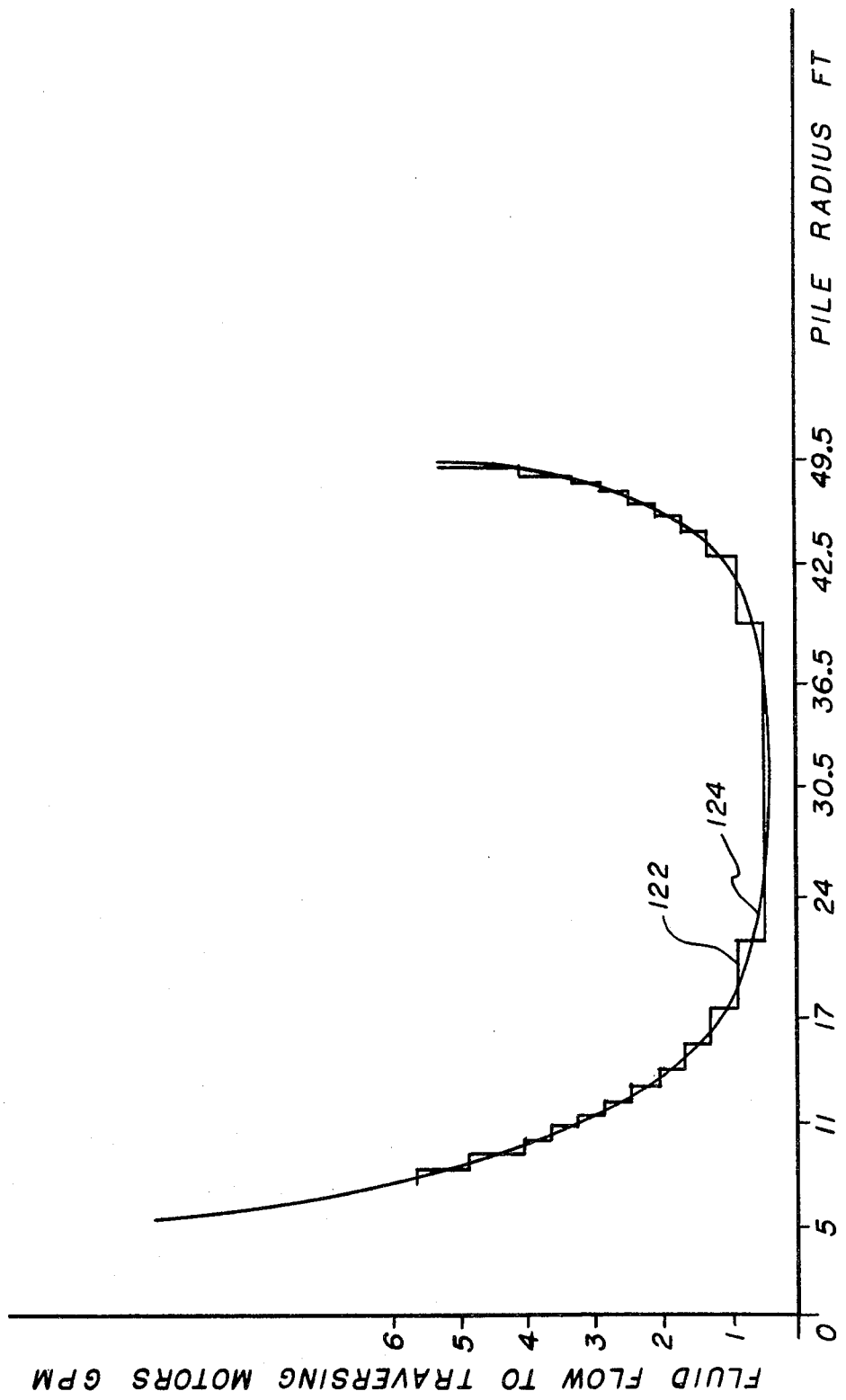
FIG. 17 is a graph in which the thoretical curve of the fluid flow to the traversing motors is superimposed on the stepped path of the actual flow of fluid to the traversing motors through the control orifices.

FIG. 17 illustrates the actual stepped changes in speed caused by the proximity switches being actuated and deactuated to control the flow of hydraulic fluid through the orifices controlled by the check valves. This curve also pertains to the bucket wheel travel through a cross section of a circular pile like FIG. 16. The change in the curvature of the curves in FIGS. 16 and 17 reflect the change in the amount of volume encountered by the raker wheels and bucket wheel in a circular pile due to the pie-shaped configuration of the material encountered by the raker wheels and bucket wheel with each indexing movement of the outer end of the bucket wheel truss mounted on the circular wall or track. Obviously, the width of the pie-shaped slice of material is narrower at the inner end than at the outermost end, so the bucket wheel traversing speed must increase near the inner end. Thus, by carefully selecting the position and length of the notches and slots in the control plates, the proximity switches will be activated and deactivated in selected combinations for the desired lengths of time to control the flow of hydraulic fluid to the raker carriage drive motors 50 in the staggered curve shown on FIG. 17 which closely approximates the theoretical curve. For example, at the left side of the curve in FIG. 17, which corresponds to the inner side of the circular pile, the bucket wheel traversing speed is at its fastest with all check valves open and the hydraulic fluid flowing at 6.4 gal/min. As the bucket wheel travels outwardly, a proximity switch is deactivated, as by passing over a slot in the control plate, and the corresponding check valves closes to reduce the flow to the traversing motors by, say, for example, 0.8 gal/min. Further along, one or more other check valves are deactivated in different combinations as the proximity switches pass over slots and notches in the control plate to control the flow of hydraulic fluid along the stepped path 122 to closely match the theoretical curve 124 shown in FIG. 17. When the bracket 120 on which the proximity switches are mounted passes off the inner control plate, naturally, none of the proximity switches are activated, so all of the check valve controlled orifices are closed and the only fluid supplied to the traversing motors is through the single orifice which is not controlled by a check valve. This is indicated by the lowermost horizontal line on the stepped path over the curve in FIG. 17.

When the bucket wheel is still further from the pivot of the bucket wheel truss, the proximity switches on bracket 120 encounter the other control plate near the outer end of the bracket wheel truss over where the pile begins to slope to the ground. Here, the procedure begins to reverse, but in the same manner. The proximity of one or more proximity switches to the control plate activates the corresponding check valves which open and pass more hydraulic fluid through the desired orifices to speed up the traversing speed of the bucket wheel to closely match the desired curves.

In this example, four proximity switches are used in conjunction with four corresponding sets of slots and notches. Also, the speed is controlled as a function of 0.4 gal/min. increasing or decreasing increments. Naturally, the number of proximity switches and increments can be changed as well as the rate of fluid flow in each of the increments. These parameters would change according to the dimensions of the equipment, the desired curve to be followed and the desired traversing speed.

In this manner, the speed of the raker carriage/bucket wheel is automatically controlled across the width of the piled material to compensate for the diminishing volume of material encountered by the apparatus as the pile slopes to the ground on either side. This unique automatic traversing speed control eliminates the need for an operator and the apparatus can essentially operate by itself in conjunction with the previously described limit switches which operate to change the direction of the reciprocating elements such as the raker carriage and bucket wheel truss.

The cyclone/belt conveyor-stacker which replenishes the pile does so with substantially uniform precision so that the pile always assumes the same general size and shape at the same location, so that the position of the control plates on the bucket wheel carriage serve to relate the location where the pile begins to slope to the ground with the position of the bucket wheel along its truss. Thus, the bucket wheel begins to increase its translational movement along its truss where the pile begins to slope to the ground.

Certain modifications of the apparatus are obvious and contemplated. For example, the raker and bucket wheel trusses could be combined into a single truss (FIG. 11) on which the raker carriage and bucket wheels are both mounted. Also, the circular storage bin configuration, especially, could utilize a single boom on which one or more raker wheels are pivotally mounted. These configurations are all variations of the preferred embodiment and incorporate the same basic components principles of operation and control.

What is claimed is:

1. In an apparatus for reclaiming material from a stored pile of such material, including a longitudinally extending truss apparatus, a raker carriage mounted for reciprocal movement along the truss apparatus and having means for engaging the piled material to urge the material downwardly along the face of the pile, and means for gathering the material urged downwardly on the face of the pile, including a motor for reciprocally moving the means for gathering the material along the truss apparatus, wherein the improvement comprises:
   location means associated with either end of the truss apparatus for indicating the relative location therealong of the means for gathering the material;
   proximity means operatively associated with the means for gathering the material to move therewith and come into proximity with the location means and thereby generate signals corresponding to the relative position of the means for gathering the material along the truss apparatus;
   and speed varying means operatively associated with the motor for moving the means for gathering the material, said speed varying means operatively linked with the proximity means to control the speed of the motor for moving the means for gathering the material according to the signals received from the proximity means, whereby the traversing speed along the truss apparatus of the means for gathering the material is varied and controlled.

2. The apparatus as set forth in claim 1, wherein:
   each raker boom has two sets of raker wheels, one set mounted on each of two opposed sides thereof, the wheels on each side being canted forwardly with respect to the direction of carriage movement when the boom is in operating position.

3. The apparatus as set forth in claim 1, wherein:
   at least some of the plurality of raker wheels, including the outermost ones, relative to the raker carriage, are pivotally mounted on the booms to thereby be capable of moving in their plane of rotation relative to the other raker wheels.

4. The apparatus as set forth in claim 1, wherein:
   each raker wheel is independently powered whereby the raker wheels at the outermost end of each boom, with respect to the carriage, are rotated at a slower speed than the innermost raker wheels.

5. The apparatus as set forth in claim 1, wherein: successive adjacent raker wheels along each boom from the raker carriage extend further forwardly in the direction of carriage movement, whereby material contacted by a relatively outer raker wheel is urged into the path of its adjacent, relatively inner, raker wheel to be ultimately received by the means for gathering the material.

6. The apparatus as set forth in claim 3, wherein: on at least one boom, the innermost raker wheel, with respect to the carriage, is rotatably mounted to the boom in a fixed position whereby it rotates in a plane substantially at right angles to the direction of carriage translational movement along the raker truss.

7. Apparatus for reclaiming material from a stored pile of such material comprising, in combination:
a longitudinally extending raker truss;
a longitudinally extending bucket wheel truss positioned substantially below said raker truss and coextending therewith;
a pair of end trusses in which the ends of the raker and bucket wheel trusses are mounted to coextend therebetween;
means for moving the end trusses so that the raker and bucket wheel trusses are moved about the pile of material;
a raker carriage moveably mounted on the raker truss for reciprocal movement along the longitudinal length thereof;
a bucket wheel rotatably and translatably mounted about the bucket wheel truss for gathering material removed from the stored pile;
means for rotating the bucket wheel;
means for moving the raker carriage and bucket wheel in synchronized reciprocating movement along the length of the raker truss;
at least one raker wheel boom extending outwardly from the raker carriage;
a plurality of raker wheels rotatably mounted to each raker boom on two sides thereof, at least some of the raker wheels on each side being pivotally mounted to the raker boom whereby the raker wheels so mounted are moveable relative to one another on the pile of material;
means for rotating the raker wheels in a direction whereby material contacted on the pile beneath each one will be urged downwardly toward the bottom of the pile where it can be gathered by the rotating bucket wheel;
control means operatively linked to the means for moving the bucket wheel in reciprocating movement along the length of the bucket wheel truss for increasing the traversing speed therealong as it nears either end of the bucket wheel truss so that the quantity of material gathered along the length of the bucket wheel truss is substantially constant from one end to the other;
a conveyor substantially coextending with the bucket wheel truss for receiving material from the bucket wheel and removing it from the apparatus.

8. The apparatus as set forth in claim 7, wherein: the raker wheels on both sides of each raker boom are pivotally mounted; and further including, means for selectively pivoting the raker wheels on either side of each boom to lower them into engagement with the piled material.

9. The apparatus as set forth in claim 7, wherein: the raker wheels are mounted to rotate in substantially vertical planes;
at least some of the raker wheels on the two sides of each boom are canted so that the planes of rotation of the canted wheels on each side are angled forwardly, with respect to the direction of carriage movement when the boom is in operating position with the raker wheels engaging the pile of material.

10. The apparatus as set forth in claim 9, wherein: adjacent raker wheels on a side of each raker boom extend along the length of the boom and rotate in spaced apart, overlapping planes whereby the rotating wheels contact overlapping areas of the piled material so that material contacted and loosened by each raker wheel is urged inwardly, relative to the bucket wheel, and downwardly along the face of the pile to be contacted by the adjacent raker wheels to be eventually delivered into proximity of the bucket wheel to be thereby gathered and delivered to the conveyor.

11. The apparatus as set forth in claim 10, wherein: at least some of the raker wheels on each boom are independently driven with the outermost raker wheel rotated at a slower speed than the innermost raker wheel relative to the carriage.

12. The apparatus as set forth in claim 10, wherein: there are two booms mounted to the raker carriage, on opposed sides thereof, with the raker wheels on each boom mounted on the side to force the raker wheels on the other boom;
one of the raker wheels near the raker carriage on each of the booms is mounted to rotate in a plane substantially perpendicular to the direction of carriage movement along the raker truss;
the raker wheels on a side of each boom are canted outwardly toward the oncoming direction of movement of the carriage when the boom is in operating position against the piled material;
the circle of rotation of each raker wheel on each boom overlaps the circle of rotation of the adjacent raker wheel on the same side of each boom whereby material contacted by the outermost raker wheel is urged downwardly on the pile to the proximity of the adjacent rotating raker wheel to thereby be encountered and eventually urged to the bottom of the pile where the raker wheel rotating at substantially right angles to the direction of carriage movement urges the material into proximity with the bucket wheel to be gathered therein.

13. Apparatus for reclaiming material from a stored pile of such material comprising, in combination:
a longitudinally extending truss apparatus;
means moveably supporting the ends of the truss apparatus for substantially transverse movement about the stored pile of material;
means for moving the truss apparatus about the pile of stored material;
a raker carriage moveably mounted on the truss apparatus for reciprocal movement along the longitudinal length thereof;
a bucket wheel rotatably and translatably mounted about the truss apparatus for reciprocal movement therealong for gathering material removed from the stored pile;

means for rotating the bucket wheel;

means for moving the raker carriage and bucket wheel translatably in reciprocal movement along the truss;

at least one raker wheel boom mounted on the raker carriage and extending outwardly therefrom;

at least one raker wheel rotatably mounted to each raker wheel boom;

means for rotating each raker wheel in a direction whereby material contacted on the pile beneath each one will be urged downwardly toward the bottom of the pile where it can be gathered by the rotating bucket wheel;

control means operatively linked to the means for moving the bucket wheel in reciprocating movement along the length of the truss for increasing the traversing speed therealong as it nears either end of the bucket wheel truss so that the quantity of material gathered along the length of the bucket wheel truss is substantially constant from one end to the other;

a conveyor substantially coextending with the truss apparatus for receiving material from the bucket wheel and removing it from the apparatus.

14. The apparatus as set forth in claim 13, wherein:

there are a plurality of raker wheels mounted to each raker boom with at least one of the raker wheels on each boom being pivotally mounted thereon to thereby rotate about its pivot to contact and follow changes in the contour of the piled material;

each raker wheel is independently powered; and each raker wheel on each boom is rotated at a different speed with the outermost raker wheel on the boom rotating at a slower speed than the innermost raker wheel on the same boom.

15. The apparatus as set forth in claim 13, wherein:

the means for moving the bucket wheel along the truss comprises at least one pump driven hydraulic motor;

the control means comprises (1) a perforated plate mounted to the truss at either end thereof;

(2) a plurality of proximity switches associated with the bucket wheel for passing over the perforated plates as the bucket wheel moves in reciprocating translational movement over the truss, whereby the proximity switches generate signals when in proximity to the metal in the perforated plates and do not generate signals when over perforations in the plate;

(3) a bank of orifices interposed between the pump and each hydraulic motor powering the bucket wheel in translational movement along the truss;

(4) a plurality of check valves corresponding to the proximity switches and receiving signals therefrom for selectively opening and closing the orifices to control the speed of each motor powering the translational movement of the bucket wheel.

* * * * *